United States Patent
Song et al.

(10) Patent No.: US 8,563,346 B2
(45) Date of Patent: Oct. 22, 2013

(54) METHOD FOR MANUFACTURING ELECTRODE OF DYE-SENSITIZED SOLAR CELL AND DYE-SENSITIZED SOLAR CELL HAVING ELECTRODE THEREOF

(75) Inventors: Mi Yeon Song, Seoul (KR); Sang Hak Kim, Seoul (KR); Yong Jun Jang, Gyeonggi-do (KR); Won Jung Kim, Gyeonggi-do (KR); Yong Gu Kim, Gyeonggi-do (KR); In Woo Song, Gyeonggi-do (KR); Chul Kyu Song, Gyeonggi-do (KR)

(73) Assignees: Hyundai Motor Company, Seoul (KR); SolarCeramic Co., Ltd., Seoul (KR)

( * ) Notice: Subject to any disclaimer, the term of this patent is extended or adjusted under 35 U.S.C. 154(b) by 211 days.

(21) Appl. No.: 13/099,603

(22) Filed: May 3, 2011

(65) Prior Publication Data
US 2012/0085402 A1    Apr. 12, 2012

(30) Foreign Application Priority Data
Oct. 12, 2010   (KR) .......................... 10-2010-0099045

(51) Int. Cl.
  *H01L 21/00*   (2006.01)
  *H01L 21/44*   (2006.01)
  *H01L 21/28*   (2006.01)

(52) U.S. Cl.
  USPC ............ 438/57; 438/63; 438/69; 438/98; 438/578; 438/666; 257/E21.001; 257/E31.126

(58) Field of Classification Search
  USPC .................. 438/57, 63, 66, 69, 98, 578, 666; 136/244, 252, 255–256, 258; 257/E21.001, E31.126
  See application file for complete search history.

(56) References Cited

U.S. PATENT DOCUMENTS

| | | | |
|---|---|---|---|
| 8,029,722 B2* | 10/2011 | Mattila et al. ................. | 264/450 |
| 8,035,185 B2* | 10/2011 | Suzuki et al. ................. | 257/453 |
| 8,088,206 B2* | 1/2012 | Bentley ....................... | 106/31.13 |
| 8,486,306 B2* | 7/2013 | Kamikoriyama et al. .... | 252/513 |
| 2005/0238804 A1* | 10/2005 | Garbar et al. ................. | 427/180 |
| 2009/0053511 A1* | 2/2009 | Kim et al. ..................... | 428/332 |
| 2010/0326516 A1* | 12/2010 | Morooka ....................... | 136/256 |
| 2012/0121800 A1* | 5/2012 | Kim et al. .................... | 427/98.5 |

FOREIGN PATENT DOCUMENTS

| KR | 10-2007-0055404 | 5/2007 |
|---|---|---|
| KR | 10-2010-0009309 | 1/2010 |
| WO | 00/44051 | 7/2000 |
| WO | 2007080997 | 7/2007 |

\* cited by examiner

*Primary Examiner* — Mohsen Ahmadi
(74) *Attorney, Agent, or Firm* — Edwards Wildman Palmer LLP; Peter F. Corless

(57) ABSTRACT

The present invention provides a method for manufacturing an electrode of a dye-sensitized solar cell using an inkjet printing process, an electrode formed thereby, and a dye-sensitized solar cell having the electrode. According to the method, a metal electrode is formed by jetting an ink solution containing nano metal powder on a transparent substrate or a transparent substrate in which a barrier layer is deposited to improve coating performance of a transparent conductive layer. A transparent conductive layer is formed on the transparent substrate on which the metal electrode is formed. The transparent conductive layer protects the metal electrode from liquid electrolyte.

10 Claims, 7 Drawing Sheets

(a)

(b)

(c)

(d)

METHOD FOR MANUFACTURING ELECTRODE OF DYE-SENSITIZED SOLAR CELL AND DYE-SENSITIZED SOLAR CELL HAVING ELECTRODE THEREOF

CROSS-REFERENCE TO RELATED APPLICATION

This application claims under 35 U.S.C. §119(a) the benefit of Korean Patent Application No. 10-2010-0099045 filed Oct. 12, 2010, the entire contents of which are incorporated herein by reference.

BACKGROUND (a) Technical Field

The present invention relates to a method for manufacturing an electrode of a dye-sensitized solar cell using an inkjet printing process, an electrode formed thereby, and a dye-sensitized solar cell having the electrode. More particularly, it relates to a method for manufacturing an electrode of a dye-sensitized solar cell module wherein a thin metal electrode is formed using an inkjet printing process, and wherein a transparent conductive film coating is provided to protect the metal electrode.

(b) Background Art

Generally, dye-sensitized solar cells include a working electrode coated with $TiO_2$ including Ru-based dye capable of absorbing light on a transparent electrode, a counter electrode coated with platinum, and an $I^-/I_3^-$ based electrolyte disposed between the working electrode and the counter electrode.

Recently, much research has been conducted on dye-sensitized solar cells due to their relatively low manufacturing cost, transparent electrodes, and presence of various designs. However, typical dye-sensitized solar cells are disadvantageous in that the photoelectric conversion efficiency rapidly decreases as the unit area of the dye-sensitized solar cell increases. In an attempt to address the above limitation, studies are being extensively conducted to enhance the photoelectric conversion efficiency by reducing the resistance through formation of a metal electrode on a transparent substrate.

Dye-sensitized solar cells require a protective layer to protect a metal electrode from the electrolyte because such cells use liquid electrolyte.

Glass frit has been widely used as a protective layer, but it has a limitation because the electrolyte penetrates into the glass frit to oxidize the metal electrode and reduce the photoelectric conversion efficiency and durability. In other words, typical dye-sensitized solar cells still have a limitation of corrosion of an electrode. Thus, various methods are being studied in attempt to overcome this limitation.

According to one of the various methods, a metal electrode is first formed by a typical screen printing method on a flat or curved glass substrate or a glass substrate coated with a barrier layer, and then a transparent conductive layer is formed thereon. The barrier layer prevents sodium ions (Na+) contained in glass components, such as $SiO_2$, from passing through to the transparent conductive film and/or improves adhesive property between the surface of the glass substrate and the transparent conductive film.

In this case, the metal electrode can be directly fabricated on the substrate without requiring disposition of a specific barrier layer between the substrate and metal electrode. In case of soda-lime glass, since conductive film coating is difficult due to sodium ions (Na+) escaping from the glass components during the conductive film coating, a barrier layer is first formed.

Also, in cases where the surface of a glass substrate is rough, a barrier layer may be introduced to improve the state of the glass surface. Accordingly, the adhesion and uniformity of the conductive film can be improved during the formation of the transparent conductive film.

The above method for forming the electrode of the dye-sensitized solar cell advantageously improves durability by protecting the metal electrode with the transparent conductive film.

A typical screen printing method may be used for forming a metal electrode. The metal electrode formed by the screen printing method has a thickness of about 5 µm or higher, often about 10 µm. Further, the transparent conductive film generally has a thickness of about 500 nm to 1 µm. Therefore, it is necessary to considerably reduce the thickness of the metal electrode so that it can be adequately protected from liquid electrolyte. In other words, although a metal electrode needs to be protected from liquid electrolyte during the formation of the electrode of the typical dye-sensitized solar cell, since the transparent conductive film having a thickness of about 1 µm is much thinner than the metal electrode having a thickness of at least 5 µm, it is difficult to protect the metal electrode from liquid electrolyte.

In an attempt to increase the area of the dye-sensitized solar cell and improve reduction of the photoelectric conversion efficiency in manufacturing a module thereof, there has been proposed a method in which a lithography process is used to etch a portion of a line where a metal electrode is formed by a thickness of the metal electrode. Then a metal is filled into the etched portion through electroplating or electrolessplating, and then a conductive film is formed thereon. However, this method is not advantageous because a process for manufacturing a mask for etching the substrate is required, and expensive equipment is further required.

There has been proposed another method in which a metal electrode is thinly formed by sputtering, chemical vapor deposition, and electrolessplating processes. This method includes forming a pattern using photolithography or E-beam lithography processes to form a metal electrode, followed by forming a metal mesh layer through etching. When a resist pattern is first coated on a substrate, and then irradiated by UV through a mask of a pattern to be manufactured, a light receiving portion undergoes a change in its chemical structure and dissolves in a developer solution. A metal electrode is coated/deposited on the dissolved portion, and then the resist pattern of the other portion is removed. Since this method includes an additional process of etching a metal electrode after a mask manufacturing process, the manufacturing process is complicated. Further, a large amount of compounds are used during the mask manufacturing process and the etching process, and samples may be contaminated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a method for manufacturing an electrode of a dye-sensitized solar cell using an inkjet printing process, an electrode thus formed, and a dye-sensitized solar cell having the electrode. According to the present invention, the electrode can be fabricated without an additional process for forming a protection layer, particularly by forming a thinner metal electrode using an inkjet printing process and depositing a transparent conductive film to protect the metal electrode from liquid electrolyte.

In one aspect, the present invention provides a method for manufacturing an electrode of a dye-sensitized solar cell using an inkjet printing process, the method comprising: forming a metal electrode by jetting an ink solution, particularly an ink solution containing nano metal powder, on a transparent substrate or a transparent substrate in which a barrier layer has been deposited; and forming a transparent conductive layer on the transparent substrate on which the metal electrode is formed, the transparent conductive layer provided so as to protect the metal electrode from liquid electrolyte. According to embodiments of the present invention, the barrier layer can be deposited on the substrate to improve properties, particularly to improve coating performance of a subsequently deposited transparent conductive layer.

In a preferred embodiment, the metal electrode may have a width of about 50 to about 1000 μm, and a thickness of no greater than about 5,000 nm, preferably from about 500 nm to about 5,000 nm.

In another preferred embodiment, the ink solution may be obtained by mixing nano metal powder with a polar or nonpolar solvent. The nano metal powder can be any such known powders suitable for use in forming metal electrodes. Preferably, the nano metal powder has a particle size no greater than about 100 nm, preferably from about 20 nm to about 100 nm.

Preferably, the ink solution comprises about 10 wt % to about 95 wt % of the nano metal powder and about 5 wt % to about 90 wt % of the polar or nonpolar solvent.

In preparing the ink solution, the polar or nonpolar solvent may comprise about 0 wt % to about 100 wt % of a low boiling point solvent and about 0 wt % to about 100 wt % of a high boiling point solvent, depending on the type of the nano metal powder.

In still another preferred embodiment, the nano metal powder may include silver powder and/or gold powder.

Any known polar solvents can be used to form the ink solution. In a preferred embodiment, examples of the polar solvent include, but are not limited to, ethyl alcohol, methyl alcohol, butyl alcohol, ethylene glycol, isopropanol, ethoxy ethanol, methoxy ethanol, buthoxy ethanol, alpha-terpineol, n-methyl-2-pyrolidone, water, and mixtures thereof.

Any known nonpolar solvents can be used to form the ink solution. In a preferred embodiment, examples of the nonpolar solvent include, but are not limited to, xylene, hexane, octane, toluene, tetrahydrofuran (TFH), dimethylformamide, chloroform, ethylene glycol monobutyl ether, and mixtures thereof.

Further, the polar or nonpolar solvent can be prepared respectively by mixing a low boiling point solvent and a high boiling point solvent. Depending on the type of the nano metal powder, the polar or nonpolar solvent may comprise about 0 wt % to about 100 wt % of a low boiling point solvent and about 0 wt % to about 100 wt % of a high boiling point solvent. For example, if the selected nano metal powder is more effectively dispersed in a low boiling point solvent, the ink solution may be prepared by dispersing the nano metal powder by mixing with a low boiling point solvent and then mixing with a high boiling point solvent. On the other hand, if the selected nano metal powder is more effectively dispersed in a high boiling point solvent, the ink solution may be prepared by dispersing the nano metal powder by mixing with a high boiling point solvent and then mixing with a low boiling point solvent For example, the ink solution may be prepared by mixing 20 wt % of nano metal powder, 70 wt % of ethanol (low boiling point solvent), and 10 wt % of ethylene glycol (high boiling point solvent). Here, nano metal electrodes can be formed while slowing the volatilization rate of the solvent, thereby forming nano metal electrode with a uniform thickness. As such, where it would be desirable to control the rate of solvent volatility regarding an ink solution already printed, a polar or nonpolar solvent may be prepared by mixing a low boiling point solvent and a high boiling point solvent in suitable relative amounts depending on the type of the nano metal powder.

In still yet another preferred embodiment, the ink solution is selectively used according to the polarity of the transparent substrate. For example, ethylene glycol may be suitably used if the surface polarity of the transparent substrate is hydrophobic, and ethylene glycol monobutyl ether may be suitably used if the surface polarity of the transparent substrate is hydrophilic.

In a further preferred embodiment, the transparent substrate may include flexible substrates and glass substrates having a certain predetermined curvature.

In another further preferred embodiment, the transparent conductive film may be formed by depositing a suitable oxide, such as fluorine-doped tin oxide, indium tin oxide, or a mixture thereof.

In another aspect, the present invention provides an electrode produced by the present methods for manufacturing an electrode of a dye-sensitized solar cell.

In still another aspect, the present invention provides a dye-sensitized solar cell employing the electrode.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
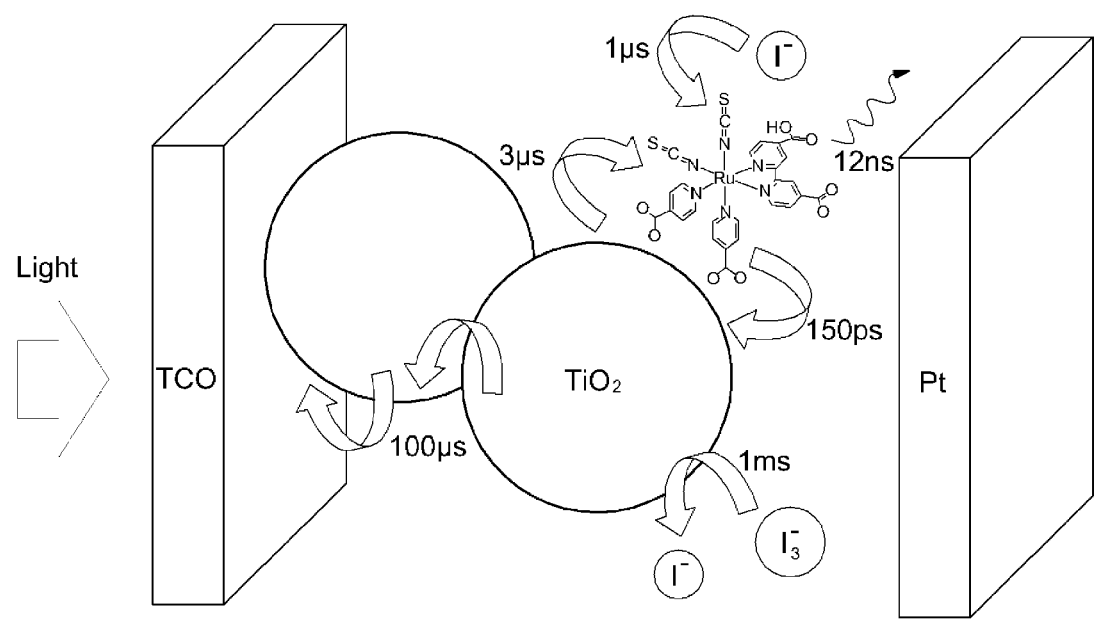
FIG. 1 is a diagram illustrating a typical dye-sensitized solar cell.
Figure 2:
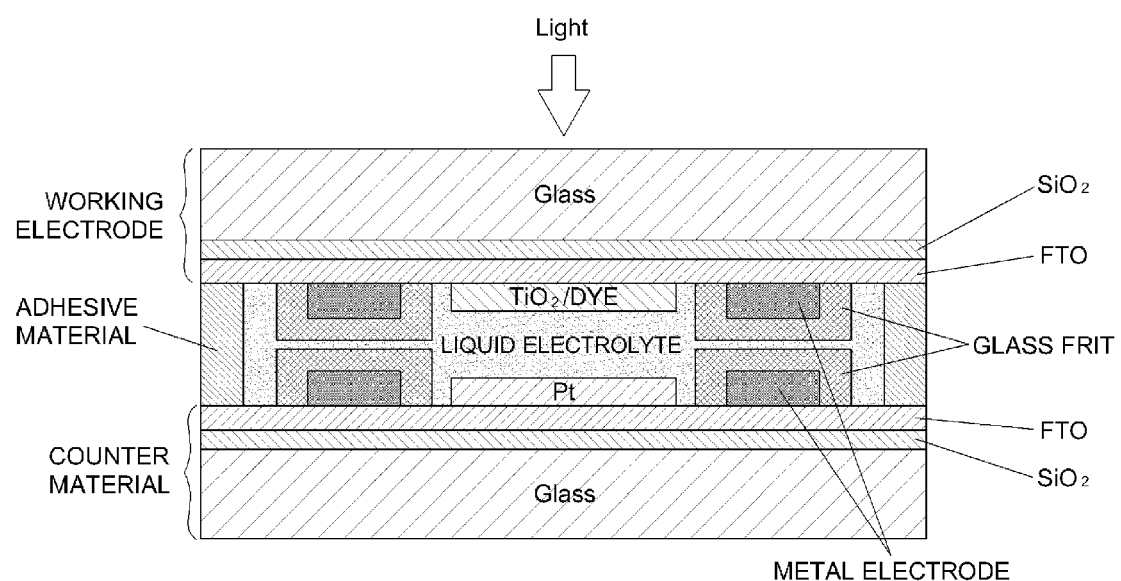
FIG. 2 is a cross-sectional view illustrating electrodes of a dye-sensitized solar cell according to a related art.
Figure 3:
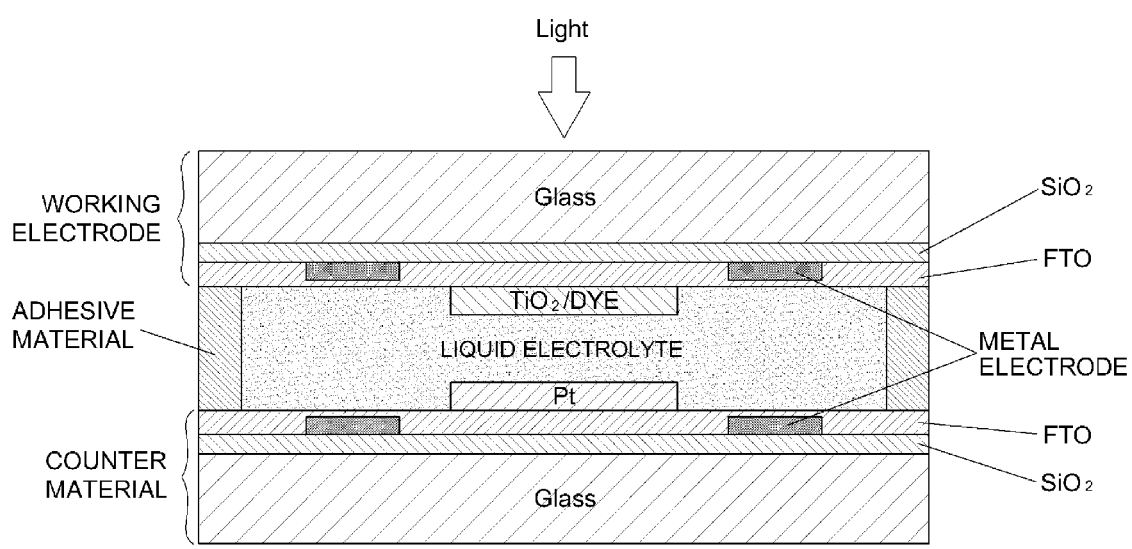
FIG. 3 is a cross-sectional view illustrating electrodes of a dye-sensitized solar cell according to an embodiment of the present invention.
Figure 4:
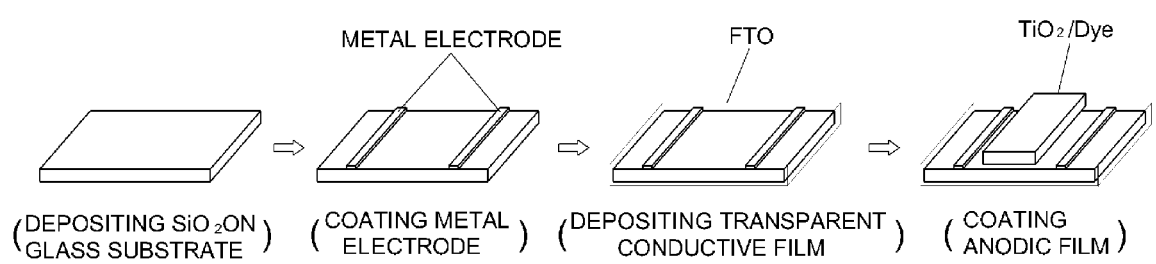
FIG. 4 is a diagram illustrating a process of fabricating an electrode of a dye-sensitized solar cell according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Terms used in the present invention are used to merely describe a specific embodiment, and are not intended to limit the present invention. Redundant description of the same parts as known technology will be omitted for simplicity of explanation.

The present invention relates to a method for fabricating an electrode of a dye-sensitized solar cell module using an inkjet printing process. In particular, the present invention provides a dye-sensitized solar cell with an electrode having a multi-layered structure in which a metal electrode coated on a transparent substrate is located under a transparent conductive film. According to particularly preferred embodiments, a barrier layer of $SiO_2$ is first deposited on the transparent substrate, followed by the electrode, over which is disposed the transparent conductive film.

According to embodiments of the present invention, the inkjet printing method that is applied to form the metal electrode coating may be any one of such printing methods that use contactless patterning technology while injecting a solution or a suspension through a fine nozzle. Contrary to lithography processes and screen printing, the inkjet printing method of the present invention does not require a mask for forming fine lines, and, further, can generally be carried out regardless of the size of a substrate to be printed. Also, the inkjet printing method is a simple process and involves a short printing time, and is, thus, further advantageous. Still further, since materials are not wasted (or are minimally wasted) using the present method, a cost-saving effect is further provided.

According to an embodiment, when electrodes (working electrode and counter electrode) of a solar cell are fabricated using the present inkjet printing process, the thickness of the electrodes can be reduced compared to a related art.

For example, when a metal electrode is printed by a screen printing method, the metal electrode is formed with a thickness of about 10 μm or greater. Also, when a protection layer such as glass frit is provided, the total thickness of the electrode may exceed about 30 or even 40 μm. In this case, when the counter electrode and the working electrode are connected to each other, a gap between electrodes is generated that is about 70 μm or larger. This may contribute to enhancement of the resistance in a device.

According to an embodiment of the present invention, an inter-electrode gap and an inter-electrode resistance is reduced during the manufacture of a module, by forming a metal electrode with a relatively smaller thickness by means of an inkjet printing method.

According to various embodiments, when a metal electrode is manufactured using the inkjet process according to the present invention, an inter-electrode gap can be reduced by about 20 μm or larger when compared to the size of inter-electrode gaps formed using conventional methods (which provide, for example, gaps of about 70 μm or larger). Accordingly, a resistance generated due to the inter-electrode gap can be reduced, thereby improving the photoelectric conversion efficiency.

The inkjet printing process according to the present may also be applied to a process for fabricating a typical dye-sensitized solar cell, as well as a process of fabricating an electrode of a dye-sensitized solar cell having a multi-layered structure of a metal electrode and a transparent conductive film.

According to an embodiment of the present invention, in order to protect a metal electrode of a dye-sensitized solar cell module, a barrier layer may be formed on a glass substrate using materials such as $SiO_2$ (through screen printing, electroplating, electrolessplating, and sputtering), and then a thinner metal electrode may be formed by an inkjet printing method. Thereafter, a transparent conductive film may be deposited using a material such as FTO. Thus, by using methods of the present invention, an additional process for fabricating a protection layer, such as typical glass frit, can be omitted.

When a metal electrode is formed by a typical screen printing method, the metal electrode formed may be much thicker than a transparent conductive film (which will generally have a thickness of about 1 μm), thereby causing a defect in the transparent conductive film (conductive glass film).

According to an embodiment of the present invention, in order to prevent the above defect, a metal electrode of a thin film is formed on a transparent substrate through an inkjet printing process, and then a transparent conductive film may be deposited thereon. According to the present methods, complicated processes (e.g., lithography and etching processes) required by the related art can be omitted.

Hereinafter, a method for fabricating an electrode of a dye-sensitized solar cell according to an embodiment of the present invention will be described in detail.

A barrier layer may first be formed on a transparent substrate formed of glass or the like by depositing a material, such as $SiO_2$. An ink solution may then be applied through an inkjet printing method to form a metal electrode on a certain position of the barrier layer.

According to various embodiments, the transparent substrate may include a flexible substrate or a glass substrate having a certain curvature.

The inkjet solution may include any such suitable solutions for formation of a metal electrode, such as an ink solution containing nano metal powder, such as silver or gold. The nano metal powder may be suitably sized, and, for example, in some embodiments may have a particle size of about 20 to 100 nm.

The above particle size range is particularly preferred because, in some embodiments, when the particle size deviates from this range, a reduction of the conductivity may occur, or an increase in the thickness or width of the electrode may be required to maintain the equivalent conductivity.

According to some embodiments, the ink solution may include a solution obtained by mixing nano metal powder with a polar or nonpolar solvent, particularly by mixing about 10 to 95 wt % of nano metal powder with about 5 to 90 wt % polar or nonpolar solvent. As noted above, the wt % of nano metal powder is based on the total weight of the ink composition.

According to various embodiments, when the weight of the nano metal powder mixed with the polar or nonpolar solvent deviates from the above range, if the content of the nanoparticles is low, there may be difficulty in forming a metal electrode.

Examples of the polar solvent include, but are not limited to, ethyl alcohol, methyl alcohol, butyl alcohol, ethylene glycol, isopropanol, ethoxy ethanol, methoxy ethanol, buthoxy ethanol, alpha-terpineol, n-methyl-2-pyrolidone, and water.

Examples of the nonpolar solvent include, but are not limited to, xylene, hexane, octane, toluene, tetrahydrofuran (THF), dimethylformamide, chloroform, and ethylene glycol monobutyl ether.

According to some embodiments, the ink solution may be selected taking into consideration the polarity of the substrate. For example, the ink solution may use ethylene glycol when the surface polarity of the substrate is hydrophobic, and may use ethylene glycol monobutyl ether when the surface polarity of the substrate is hydrophilic. Other suitable selections of ink solutions, which take into consideration the polarity of the substrate, could be determined by one of skill in the art.

The metal electrode formed by jetting the ink solution may be provided in various widths, thicknesses, and configurations. According to some embodiments, the metal electrode is formed to have a width of about 50 to 1000 µm and a thickness no greater than about 5,000 nm, preferably about 500 to 5,000 nm. According to certain embodiments, the present invention provides an electrode at a thickness less than that provided using conventional methods such as screen printing. Thus, for example, the present invention can provide an electrode by ink jetting wherein the electrode has a thickness less than 5000 nm. In some embodiments, the present invention provides an electrode having a thickness of about 4900 nm or less, about 4800 nm or less, about 4700 nm or less, about 4600 nm or less, about 4500 nm or less, about 4400 nm or less, about 4300 nm or less, about 4200 nm or less, about 4100 nm or less, about 4000 nm or less, or about 3500 or less. Such thicknesses can be provided by depositing the electrode material by ink jetting, without requiring any further process steps to further reduce thickness.

According to embodiments of the invention, when the metal electrode has a thickness of about 500 to 5,000 nm, the transparent conductive film may protect the metal electrode from penetration of electrolyte. However, when the thickness of the metal electrode exceeds the above range, a defect may occur in the transparent conductive film which allows electrolyte to penetrate and, thus, cause corrosion of the metal electrode. Accordingly, it may become difficult to fabricate an electrode of a solar cell module using electrode thicknesses outside of the noted range.

The metal electrode formed by the inkjet printing method of the present invention has an excellent transmittance, particularly compared to that formed by a typical screen printing method, such that the transparency of the dye-sensitized solar cell can be improved.

The metal electrode formed by printing of the ink solution may be cured through conventional processes, such as typical dry and heat-treatment processes, and then a transparent conductive layer may be formed on the metal electrode.

The transparent conductive layer, which is formed on the transparent substrate with the barrier film, may be formed on the metal electrode, by depositing fluorine-doped tin oxide (FTO:SnO$_2$:F), indium tin oxide, or a mixture thereof. According to an embodiment of the present invention, since the metal electrode may be protected from liquid electrolyte by forming the transparent conductive layer on the metal electrode, an additional process for forming a separate protection layer (e.g., typical glass frit or ultraviolet curing agent) may be omitted.

According to an embodiment of the present invention, a thinner metal electrode can be formed by the inkjet printing method, and thus the metal electrode can be completely protected from liquid electrolyte using the transparent conductive film formed through a typical deposition process.

A working electrode and a counter electrode may be formed by coating platinum (Pt) or titanium dioxide (TiO$_2$) with Ru-based dye on the transparent conductive film. That is, the working electrode and the counter electrode may be fabricated by forming an anodic film through coating of TiO$_2$ with Ru-based dye, or forming a platinum electrode layer through coating of Pt with Ru-based dye.

The anodic electrode layer and the platinum electrode layer may be formed using any typical deposition method, such as screen printing, doctor blade, sputter coating, spin coating, and inkjet printing.

The electrode of the dye-sensitized solar cell fabricated according to an embodiment of the present invention may be fabricated by bonding the working electrode and the counter electrode, which are formed according to the above processes, and filling electrolyte therebetween.

Hereinafter, embodiments of the present invention and comparative examples are described infra.

Example 1

First, silver powder having a particle size of about 23 nm was mixed with ethylene glycol to prepare a silver ink solution. The silver ink solution was filed into an inkjet nozzle and jetted on a hydrophobic glass substrate, and then heat-treated to form a silver electrode.

Comparative Example 1

A silver electrode was formed on a surface-treated hydrophilic substrate using the silver ink solution of Example 1 by an inkjet printing method and then heat-treated.

Comparative Example 2

A silver electrode was formed on a glass substrate using the silver ink solution of Example 1 through a screen printing method and then heat treated.

Figure 5:
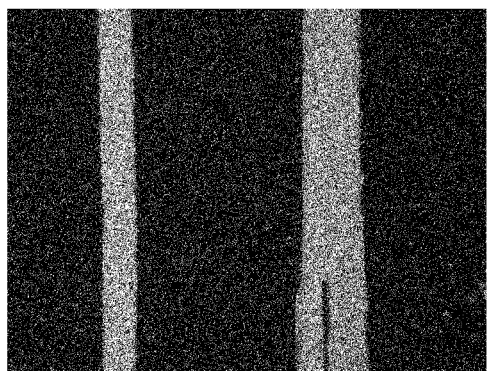
FIG. 5 is a microscopic photograph illustrating a silver electrode formed and dried on a hydrophobic glass substrate (a and b) and a surface-treated hydrophilic substrate (c and d) using a silver ink solution in a first comparative example and a first embodiment of the present invention, respectively.
Figure 5:
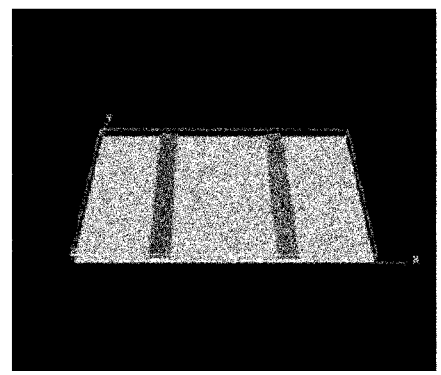
Figure 5:
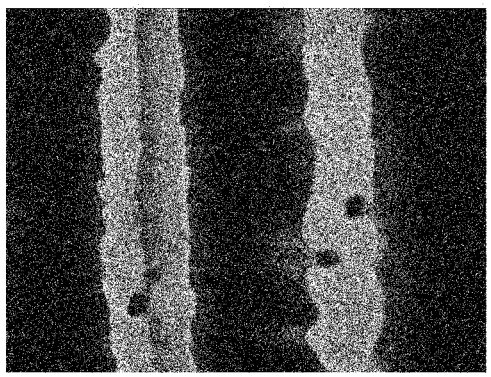
Figure 5:
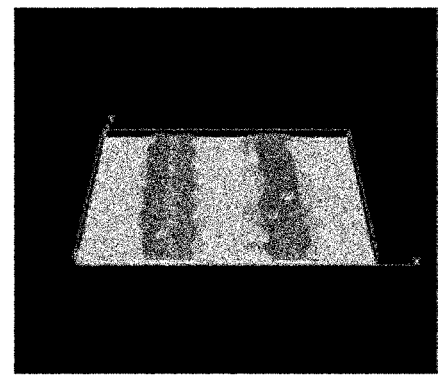

FIG. 5 is a microscopic photograph illustrating silver electrodes formed and dried on a hydrophobic glass substrate (a and b) in Example 1, and a surface-treated hydrophilic substrate (c and d) in Comparative Example 1, using a silver ink solution, respectively.

Figure 6:
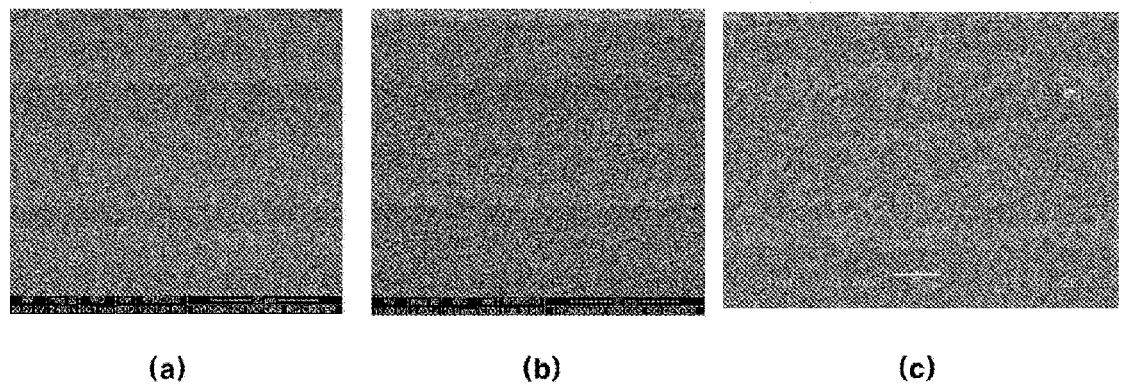
FIG. 6A is a microscopic photograph illustrating a silver electrode formed on a glass substrate in the first embodiment.
FIG. 6B is a microscopic photograph illustrating a silver electrode formed on a surface-treated substrate in the first comparative example.
FIG. 6C is a microscopic photograph illustrating a silver electrode with a thickness of about 10 μm formed through a silk screen printing process and heat-treated in Comparative Example 2.

FIG. 6A is a microscopic photograph illustrating the silver electrode formed on a glass substrate in Example 1, FIG. 6B is a microscopic photograph illustrating the silver electrode formed on a surface-treated substrate in the Comparative Example 1, and FIG. 6C is a microscopic photograph illustrating a silver electrode with a thickness of about 10 μm formed through a silk screen printing process and heat-treated in Comparative Example 2;

Referring to FIG. 5, the silver electrode of the glass substrate according to Example 1 may be formed without spreading of hydrophilic silver ink. Since the silver electrode has a thickness of about 0.6 to 1 μm and smooth connection between silver ink drops, the silver electrode may be used as an electrode of a solar cell module.

Also, the silver electrode having a thickness of about 1 μm according to Example 1 may be simply fabricated without a separate mask for forming a protection layer of the silver electrode. The silver electrode according to Example 1 may be formed to have a thickness of one-tenth of the silver electrode that is fabricated by a silk screen printing method according to Comparative Example 2. Also, the width of the electrode according to Example 1 may range from about 50 μm to about 1000 μm or more.

However, in the case of Comparative Example 1, dispersing or spreading of the silver ink solution was observed on a substrate hydrophilic to the silver ink solution, as shown in FIGS. 5C and 5D. This demonstrates the importance of matching polarity between the silver ink solution and the substrate surface so as to exhibit a clear line of the silver electrode upon formation of a fine pattern. In particular, to increase the degree of polarity match between the ink solution and the polarity of the substrate surface, a hydrophobic ink solution may be used for a hydrophilic substrate, while a hydrophilic ink solution may be used for a hydrophobic substrate.

In addition, the type of binder and solvent added to the ink solution may influence the polarity of the ink, and, thus, an ink solution suitable for a substrate should be selected according to the composition. That is, the ink solution may be selected according to the polarity of the transparent substrate, and the polarity of the transparent substrate may also be changed, such as by a method of surface treatment such as UV and plasma.

Also, as demonstrated in FIG. 6A, silver particles become connected to each other during the heat-treatment process, and are, thus, coarsened.

As demonstrated in FIG. 6B, the silver particles are dispersed. Thus, when the silver particles are dispersed (and, thus, not connected to each other), the conductivity necessary for the electrode may not be obtained. Accordingly, the electrode may not be suitably used as a metal electrode for a solar cell.

In general, a paste used for a silk screen printing method has high viscosity and requires the use of a binder, such as glass frit. Therefore, the coating provided with a silk screening method becomes thick (at least about 5 μm), and the electrode should be relatively thick to enhance the conductivity.

Unlike FIG. 6A, it is demonstrated in FIG. 6C that holes are generated due to volatilization of the binder during the heat-treatment.

The ink solution containing nano metal powder used in Example 1 (in accordance with the present invention) contains less binder than that contained in a paste for screen printing. Thus, holes are rarely generated during heat-treatment when using the present methods. This results in formation of a relatively thin electrode, which can be used as an electrode of a solar cell module by simply coating a transparent conductive film without a separate protection layer.

Example 2

The silver ink solution of Example 1 was jetted on a glass substrate to form a silver electrode having a thickness of about 1 μm, followed by heat-treatment to cure. Thereafter, a transparent conductive film was coated on the silver electrode using FTO.

Comparative Example 3

The silver ink solution of Example 1 was coated on a glass substrate by a silk screen printing method to form a silver electrode having a thickness of about 12 μm, followed by heat treatment to cure. Thereafter, a transparent conductive film was coated on the silver electrode using FTO under the same condition as Example 2.

Figure 7:
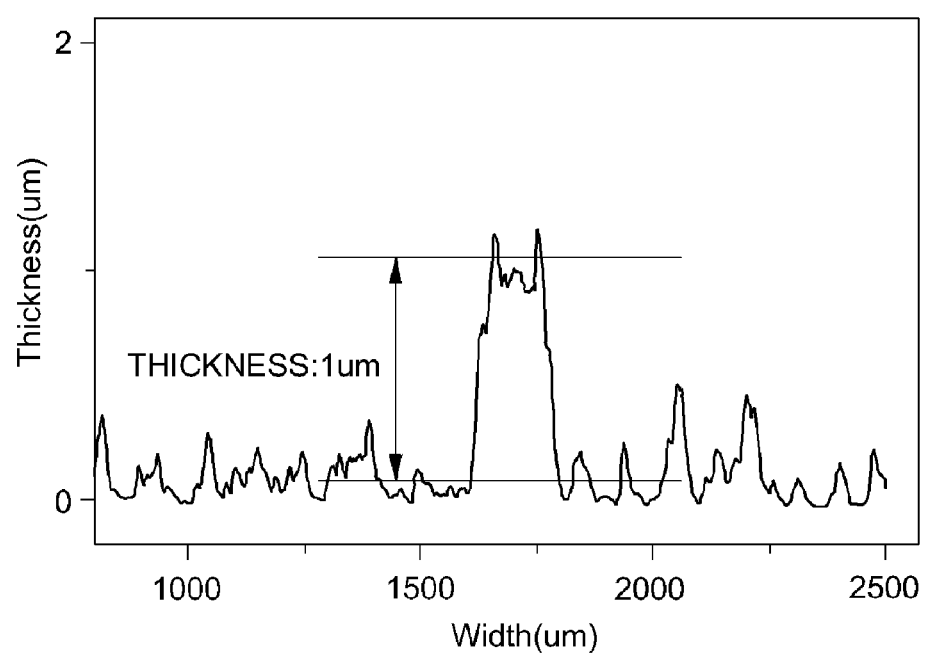
FIG. 7 is a graph illustrating the thickness of a transparent conductive film coated on a silver electrode formed by an inkjet printing process in Example 2.
Figure 8:
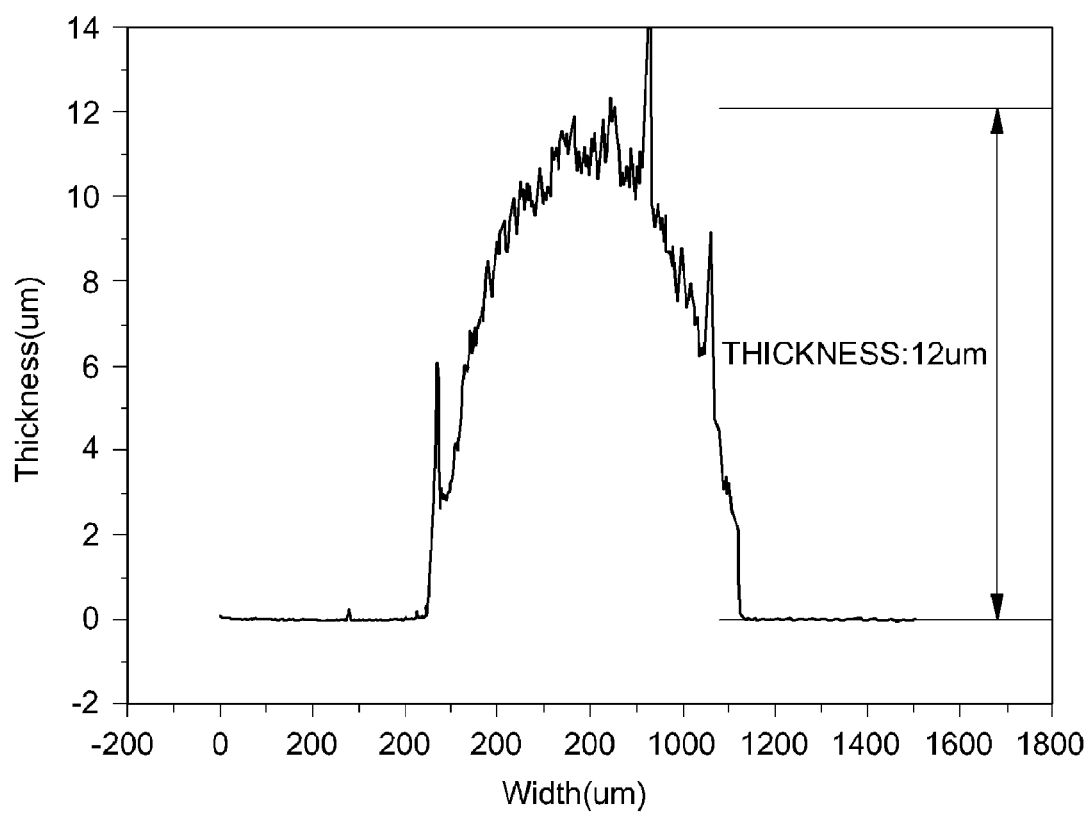
FIG. 8 is a graph illustrating the thickness of a transparent conductive film coated on a silver electrode formed by a silk screen printing process in Comparative Example 3.

As demonstrated in FIGS. 7 and 8, the thickness of the transparent conductive films that are formed according to Example 2 and Comparative Example 3 are about 1 μm and about 12 μm, respectively.

Test Example

An electrolyte penetration test was performed on electrode samples that were fabricated in Example 2 and Comparative Example 3.

Liquid electrolyte used hereinbelow was an electrolyte that is used for a dye-sensitized solar cell, and the composition used thereof is as follows.

Composition: 0.6M 1-butyl-3-methyl imidazolium iodide, 0.03 M iodine, 0.1 M guanidinium thiocyanate, 0.5 M 4-tert-butyl, pyridine in acetonitrile/valeronitrile (85/15 v/v)

For the electrolyte penetration test, the samples that were fabricated in Example 2 and Comparative Example 3 were cut to a size of about 2 cm×about 2 cm, and then a solar cell was fabricated, and then electrolyte was injected therein. Specifically, glass substrates coated with a transparent conductive film on silver electrodes, fabricated in Example 2 and Comparative Example 3, were cut into two pieces each with a size of about 2 cm×about 2 cm. Two electrolyte injection holes were formed on one surface thereof, and then two pieces of cells were joined using a surlyn tape. Thereafter, the electrolyte containing the above composition was injected, and then the injection hole was blocked. Corrosion caused by the electrolyte was then observed.

In the cell that was fabricated using the sample according to Example 2, the electrolyte did not penetrate into the transparent conductive film even about one week after the electrolyte had been injected, and the silver electrode was not damaged.

However, when the cell was fabricated using the sample according to Comparative Example 3, corrosion of the silver electrode was observed within one or two minutes after the electrolyte was injected. For reference, the change of the silver electrode was easily observed because, when the electrolyte reacted with the silver electrode to cause the corrosion of the silver electrode, the color of the electrolyte changed from yellow to transparent.

Thus, as demonstrated, if a metal electrode is fabricated using an inkjet printing method and then a transparent conductive film is coated thereon, according to an embodiment of the present invention, a solar cell module may be fabricated without requiring an additional process for forming a protection layer, such as glass frit. Accordingly, the overall process can be shortened, and the conductivity of the transparent conductive layer can be enhanced, thereby reducing the resistance between elements and improving the fill factor (FF).

To fabricate a solar cell module with a size of about 100 mm×about 130 mm, a silver electrode was formed by a screen printing method on a transparent substrate in which a barrier layer is formed by depositing $SiO_2$ on the surface. A protection layer was coated thereon using glass frit to form an electrode. In such a solar cell module, the fill factor generally ranges from about 30% to 40%. Meanwhile, when a silver electrode was formed, and a transparent conductive layer of FTO was coated thereon to form an electrode having a multi-layered structure according to an embodiment of the present invention, the fill factor increased up to about 55.36%.

Thus, the present invention relates to a method for manufacturing an electrode that is used in a dye-sensitized solar cell module, and more particularly, to a technology of forming a metal electrode on a substrate using an inkjet printing method.

According to an embodiment of the present invention, when a metal electrode is formed using an inkjet printing method, the metal electrode can be formed to have a thickness much smaller than that provided by a related art. Accordingly, the present invention provides a transparent conductive film coated on the metal electrode that can prevent the corrosion of the metal electrode caused by liquid electrolyte, and wherein a process for forming an additional protection layer for the metal electrode can be omitted.

Further, the inkjet printing method of the present invention can realize a fine pattern without requiring the use of or manufacture of an additional mask, and further consumes less ink. Accordingly, improvement in productivity and cost-savings can be expected.

Still further, since an additional protection layer for protecting a metal electrode can be omitted using the present methods, the total thickness of a working electrode and a counter electrode can be reduced. Accordingly, an inter-electrode gap is reduced, thereby reducing the inter-element resistance and improving the photoelectric conversion efficiency.

According to an embodiment of the present invention, an electrode having a multi-layered structure can be formed, and various thicknesses of the electrode and various widths of an electrode line can be formed, thereby allowing the electrode to be widely utilized as an electrode for a solar cell module.

When a dye-sensitized solar cell having a multi-layered structure is fabricated using an inkjet printing process according to the present invention, a process for forming a protection layer, such as glass frit, can be omitted. Also, the efficiency of a module can increase due to an increase of sensitivity and improvement of durability, and, thus, its can be more widely utilized.

According to embodiments of the invention, the inkjet printing process can be performed in one step using different materials, such as a working electrode and a counter electrode of a dye-sensitized solar cell module. Also, compared to a typical screen printing method, the inkjet printing process of the present invention can have various uses, such as implementation of a film having a high printing accuracy and application to a flat transparent substrate, a flexible substrate, and a substrate having a certain curvature.

According to an embodiment of the present invention, a thinner metal electrode can be formed on a transparent substrate using an inkjet printing method. Further, since a transparent conductive film coated on the metal electrode can prevent penetration of electrolyte and protect the metal electrode, a separate protection layer need not be formed. Accordingly, an additional process for forming the protection layer can be omitted, and the related cost can be saved. Also, the area of a dye-sensitized solar cell can be enlarged, and the photoelectric conversion efficiency can be improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing an electrode of a dye-sensitized solar cell using an inkjet printing process, the method comprising:
   depositing a barrier layer on a transparent substrate;
   forming a metal electrode on the barrier layer by jetting an ink solution containing nano metal powder on the barrier layer; and
   forming a transparent conductive layer on the barrier layer on which the metal electrode is formed, the transparent conductive layer configured to protect the metal electrode from a liquid electrolyte;
   forming a working electrode and a counter electrode by coating metal oxide with dye on a predetermined portion of the transparent conductive layer; and
   bonding the working electrode and the counter electrode, and filling electrolyte between the working electrode and the counter electrode,
   wherein the ink solution is formed by mixing an ink composition with a polar or nonpolar solvent, wherein the ink composition contains a nano metal powder having a particle size of about 20 nm to about 100 nm, and wherein the amount of nano metal powder is about 10 wt % to about 95 wt %, and the amount of the polar or nonpolar solvent is about 5 wt % to about 90 wt % based on the total weight of the ink composition.

2. The method of claim 1, wherein the metal electrode has a width of about 50 to about 1000 μm, and a thickness of about 500 nm to about 5,000 nm.

3. The method of claim 1, wherein the ink solution comprises a polar or nonpolar solvent, and wherein the polar or nonpolar solvent comprises about 0 wt % to about 100 wt % of a low boiling point solvent and about 0 wt % to about 100 wt % of a high boiling point solvent.

4. The method of claim 1, wherein the nano metal powder comprises silver powder and/or gold powder.

5. The method of claim 1, wherein the polar solvent is selected from the group consisting of ethyl alcohol, methyl alcohol, butyl alcohol, ethylene glycol, isopropanol, ethoxy ethanol, methoxy ethanol, buthoxy ethanol, alpha-terpineol, n-methyl-2-pyrolidone, water, and mixtures thereof; and the nonpolar solvent is selected from the group consisting of xylene, hexane, octane, toluene, tetrahydrofuran (TFH), dimethylformamide, chloroform, ethylene glycol monobutyl ether, and mixtures thereof.

6. The method of claim 1, wherein the ink solution is selected based on the polarity of the transparent substrate.

7. The method of claim 6, wherein the ink solution has a polarity that matches a surface polarity of the transparent substrate.

8. The method of claim 6, wherein ethylene glycol is used as a polar solvent if a surface polarity of the transparent substrate is hydrophobic, and wherein ethylene glycol monobutyl ether is used as a nonpolar solvent if a surface polarity of the transparent substrate is hydrophilic.

9. The method of claim 1, wherein the transparent substrate comprises a flexible substrate or a glass substrate having a predetermined curvature.

10. The method of claim 1, wherein the transparent conductive film is formed by depositing fluorine-doped tin oxide, indium tin oxide, or a mixture thereof.

* * * * *